June 6, 1961     M. B. MENTLEY     2,986,801
SPIRAL BROACH

Filed Dec. 15, 1958     3 Sheets-Sheet 1

INVENTOR.
MAX B. MENTLEY
ATTORNEYS

June 6, 1961 M. B. MENTLEY 2,986,801
SPIRAL BROACH
Filed Dec. 15, 1958 3 Sheets-Sheet 2

INVENTOR.
MAX B. MENTLEY
BY
ATTORNEYS

June 6, 1961  M. B. MENTLEY  2,986,801
SPIRAL BROACH
Filed Dec. 15, 1958  3 Sheets-Sheet 3
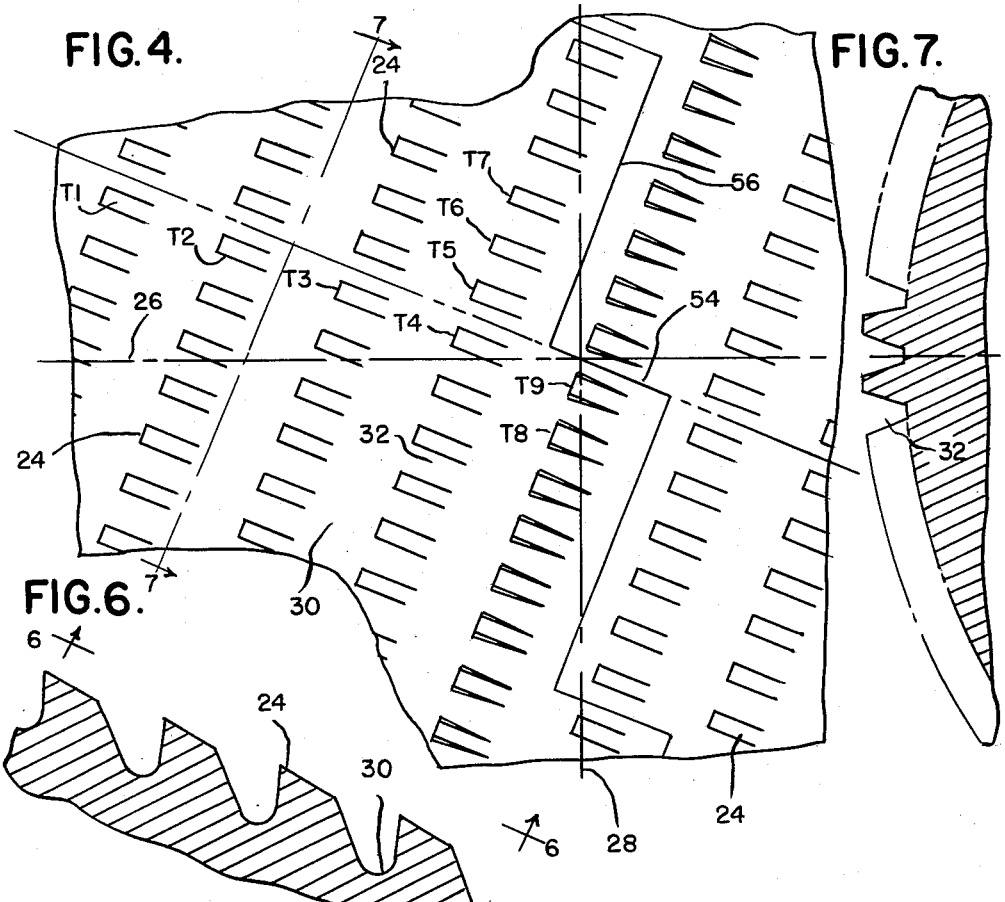
FIG. 4.
FIG. 7.
FIG. 6.
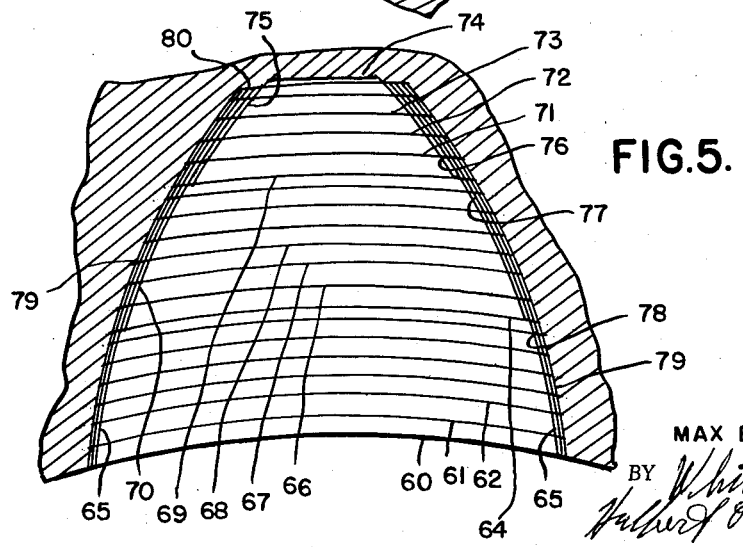
FIG. 5.
INVENTOR.
MAX B. MENTLEY
BY
ATTORNEYS

United States Patent Office 2,986,801
Patented June 6, 1961

2,986,801
SPIRAL BROACH
Max B. Mentley, Detroit, Mich., assignor to National Broach & Machine Company, Detroit, Mich., a corporation of Michigan
Filed Dec. 15, 1958, Ser. No. 780,350
6 Claims. (Cl. 29—95.1)

The present invention relates to a spiral broach.

It is an object of the present invention to provide a spiral broach comprising a support body or arbor on which are mounted a plurality of separately formed and interfitted shells.

More specifically, it is an object of the present invention to provide a spiral broach comprising an elongated body, a plurality of broaching shells of cylindrical form and of a length substantially shorter than that of the support body, the teeth on said broaching shells being helically disposed and having front cutting edges perpendicular to the teeth or adapted to perform what is referred to as a right angle cut.

It is a further object of the present invention to provide a helical broach comprising a body having fixedly secured thereon a plurality of interfitted tubular roughing shells and a finishing shell having limited circumferential movement relative to said roughing shells to permit accurate alignment of the finishing shell with the preceding roughing shell.

It is a further object of the present invention to provide a helical body of the character described comprising a plurality of roughing shells each of which is adapted to cut teeth slots to greater depth and each of which has side clearance with respect to the preceding roughing section.

It is a further object of the present invention to provide a helical body comprising a roughing section adapted to cut tooth spaces to a predetermined depth, and a finishing section having helical teeth of less height than the depth of the tooth slots as cut by the roughing section and of increasing width to perform side cutting.

It is a further object of the present invention to provide a broach as described in the preceding paragraph in which the sides of the teeth of the finishing section are provided with substantial side cutting clearance.

It is a further object of the present invention to provide a broach comprising an elongated support body, a plurality of broaching shells having teeth disposed thereon in helical alignment, said shells having end surfaces including angularly disposed portions adapted to extend only through the gullet between successive teeth and in the tooth space between adjacent laterally spaced teeth.

It is a further object of the present invention to provide a broach comprising an elongated support body, a plurality of roughing sections having helically aligned teeth, the end portions of said roughing sections including inter-engaging surfaces angularly disposed to a plane perpendicular to the axis of the broach, means clamping a plurality of roughing sections together with the teeth thereof in helical alignment, and a finishing section having an end portion shaped to interfit with the trailing end portion of the last roughing section, and means for supporting the finishing section in clearance to permit the finishing section to float into alignment with the roughing sections.

Other objects and features of the invention will become apparent as the description proceeds, especially when taken in conjunction with the accompanying drawings, illustrating preferred embodiments of the invention, wherein:

FIGURE 4 is a development elevational view showing the location of the line of separation between adjacent broach sections.

FIGURE 5 is a diagrammatic view showing successive cuts taken by the different sections of the broach.

FIGURE 6 is a fragmentary sectional view looking in the direction of the arrows 6—6, FIGURE 4.

FIGURE 7 is a fragmentary elevational view looking in the direction of the arrows 7—7, FIGURE 4, and showing the true shape of the broach rather than the flat development thereof seen in FIGURE 4.

The difficulties in making satisfactory helical broaches for broaching internally toothed parts have been so great that up to now little if any commercial broaching of internal helical gears and similar parts has been practiced.

One of the reasons for this is the fact that to produce a gear-like part, and particularly a gear-like part of anything other than extremely fine pitch, requires a broach of very considerable length. No matter how accurately the broach element is machined prior to heat treat, growth and other dimensional changes during heat treat render the finished broach inaccurate.

A second serious problem in the production of helical broaches for broaching internal gears is the inability to support the intermediate portion of the broach on a steady rest and the inability therefore to grind the teeth of the broach to the required accuracy.

In accordance with the present invention these difficulties are overcome by providing a broach which has an elongated support body or arbor which may be of substantially any required length. Suitably supported in accurately located position relative to each other on this arbor are a plurality of tubular shell broach sections. Preferably, these broach sections comprise a plurality of roughing sections interlocked together in accurately aligned relationship, and a finishing shell section allowed to float slightly with reference to the leading roughing sections so as to permit it to align itself therewith in use. Inasmuch as the accuracy of the tooth form is dependent substantially entirely upon the action of the finishing section, it becomes unnecessary to hold the teeth of the roughing section to any extreme accuracy.

The present invention permits the use of right angle cutting of helical teeth. In other words, the front face of each cutting tooth is perpendicular to the length of the tooth (the tooth dimension extending from the front face to the rear cutting end of the tooth), or to the direction of the longitudinally extending helical series of teeth. Accordingly, each cutting edge comes gradually into engagement with the work piece and it is thus possible to avoid the severe thumping which results when the cutting edges of a set of teeth are all disposed in the same plane perpendicular to the axis of the broach.

Figure 2:
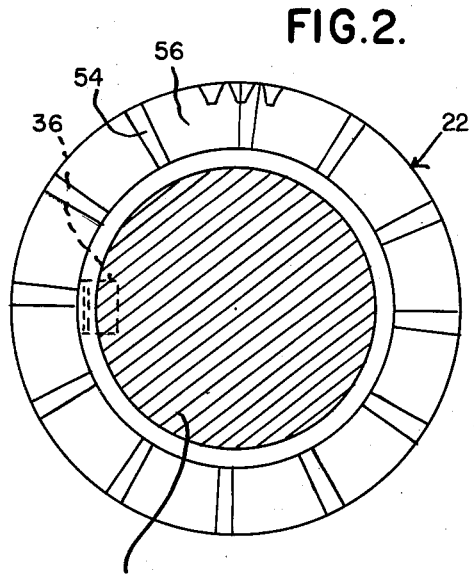
FIGURE 2 is a section on the line 2—2, FIGURE 1 with the preceding broaching shell removed.

Referring now to the drawings, the broach is seen to comprise a support body or pull bar 10 having a threaded portion adjacent the front end at 12, a threaded portion adjacent the rear end at 14, and an intermediate radially extending abutment flange 16 which is intermediate the threaded sections 12 and 14. A plurality of relatively short tubular roughing sections or shells 18, 20 and 22, and a finishing section 23 are provided, these sections being provided with broaching teeth 24 a few of which are indicated in FIGURE 2.

In FIGURE 4 there is shown a development into a plane surface of a portion of the broach. In this figure the axis of the broach is indicated at 26 and the trace of a plane perpendicular to the axis of the broach is indicated at 28. It will be observed that the teeth are arranged in helical alignment, one series of the teeth designated T1, T2, T3, T4, etc., following each other in a helical path. It will of course be appreciated that successive teeth are stepped to perform the required increased depth of cut. It will further be observed that the teeth are provided on the broach in an arrangement in which teeth T4, T5, T6, T7 etc., are in general side by side arrangement and extend around the teeth in a helically disposed series. The spaces between successive teeth T1, T2, T3, etc. constitute the gullets 30 and the space between adjacent laterally spaced teeth T4, T5, T6, etc., constitute tooth spaces 32 on the broach.

Figure 1:
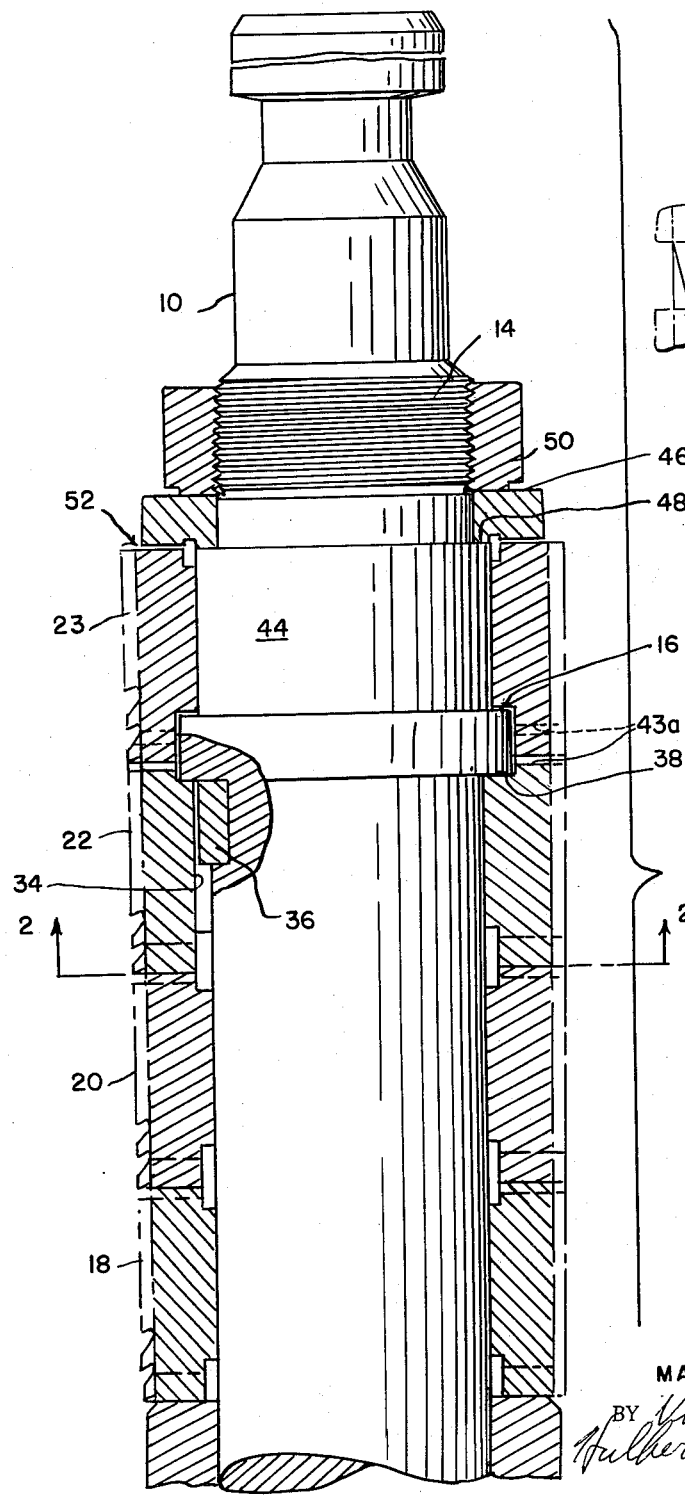
FIGURE 1 is a longitudinal section through a broach constructed in accordance with the present invention in which the teeth are merely diagrammatically represented.
Figure 1:
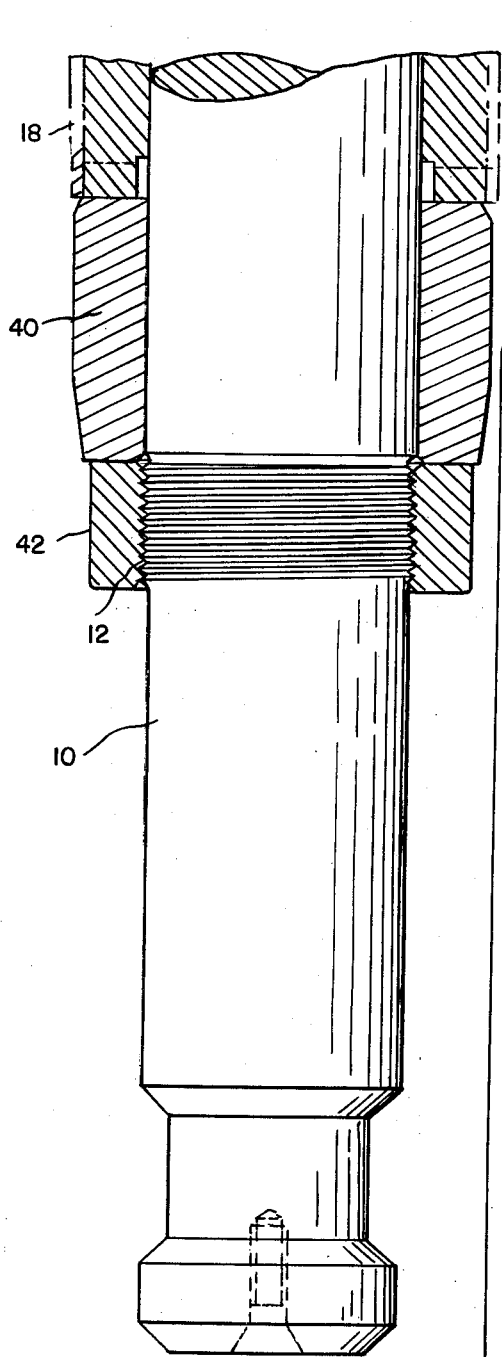

No attempt has been made to show the teeth in FIGURE 1 but it may be mentioned that in a particular broach constructed in accordance with the present invention roughing sections 18, 20 and 22 were each 12.8788" in length and provided with 24 teeth in each helically aligned series. Similarly, the finishing section 23 has a length of 12.8788" and the finishing teeth in each helically aligned series are 24 in number.

The roughing section 22 is provided with a keyway 34 which interfits with a key 36 carried by the pull bar 10. The roughing section 22 includes a shoulder 38 which abuts against the forward surface of the flange 16. The adjacent end surfaces of the roughing sections interfit as will subsequently be described in detail and a cylindrical pilot 40 abuts the leading end of the first roughing section 18. Nut 42 is threaded on the threaded portion 12 of the pulley bar and holds all of the roughing sections 18, 20 and 22 in end-abutment and in circumferential alignment as will subsequently be described.

The leading end of the finishing section 23 is also shaped to interfit loosely with the trailing end of the final roughing section 22 as indicated at 43a.

However, the finishing section 23 is allowed to float on a smooth cylindrical portion 44 of the pull bar to the rear of the flange 16. Its axial movement is limited by a combination rear pilot and spacer collar 46 urged against a shoulder 48 provided on the pull bar by the rear nut 50. The hand of the nut 50 depends upon the hand of the teeth and and in the case of a broach designed to cut right angle helix angle gear teeth, the thread is left hand. As best seen in FIGURE 1, clearance exists between the collar 46 and the finishing section 23, this clearance being indicated at 52. It will of course be appreciated that when the finishing section of the broach enters the work, it moves rearwardly against the collar 46 and during such movement aligns itself with the teeth previously cut with the work piece.

Figure 3A:
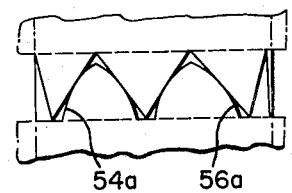
FIGURE 3A is a view similar to FIGURE 3 showing a modification of the interfitting teeth.
Figure 3:
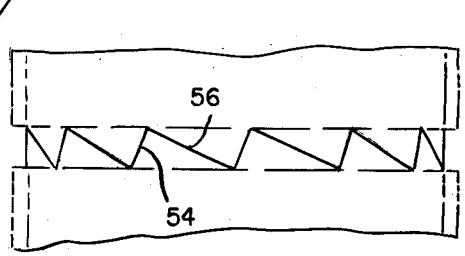
FIGURE 3 is a partially diagrammatic elevational view showing the manner in which adjacent broach shells interfit.

Referring now to FIGURES 3 and 4 the interfitting end surfaces of the broach sections follow a zigzag path including short portions 54 extending at angles substantially equal to the helix angle of the broach, and relatively longer portions 56 disposed substantially at right angles to the relatively short portions 54.

Referring more particularly to FIGURE 4, it will be seen that the relatively short portions 54 extend generally centrally through a space between adjacent laterally spaced teeth from one gullet to the next succeeding gullet. Similarly, the relatively longer surface portions 56 extend generally centrally along a gullet. With this arrangement a generally saw-toothed configuration is developed which permits adjacent sections to interfit generally in the same way as clutch teeth.

It will be observed that with the parting line between adjacent sections along the lines 54 and 56, the complete broach is assembled without losing a single tooth. On the other hand, if the adjacent sections were cut off in planes perpendicular to the axis of the broach, such for example as along the line 28, it will be observed that the teeth such as T8 and T9 would be destroyed. The omission of any tooth throws double duty on the next succeeding tooth. While a broach in which some of the teeth are required to perform double duty may be satisfactory in some applications, it is of course highly advantageous to divide the work equally among all of the teeth so that each tooth may be designed to perform with maximum capability.

If it is assumed that the broach disclosed herein is designed for broaching an internal gear having 72 teeth, and if adjacent parting lines 54 are spaced apart by a distance of six teeth, it will of course be apparent that the end of each broach section is provided with twelve of the jaw-like tooth portions constituted by surfaces 54 and 56. Obviously, the formation of these surfaces in order to produce a true interfitting action of all of the surfaces, would require extreme precision grinding. Such precision is by no means necessary and in fact, in accordance with the present invention, all but three of the adjacent pairs of surfaces 54 and 56 may be slightly relieved. The problems of providing a proper fit between three pairs of jaw-like surfaces is relatively simple.

In addition, it may be mentioned that the interfitting surfaces 54 and 56 may if desired be rendered slightly convex either in one plane so as to produce a cylindrical type of convexity, or in two planes so as to produce a spheroidal form of convexity. The former condition is illustrated in FIGURE 3A, where surfaces 54a and 56a are cylindrically convexly shaped.

As previously indicated, the teeth of the three roughing sections need not be of any exceptional accuracy. However, the teeth of the finishing section 23 are finished to the accuracy required in the finished work piece. Moreover, the teeth formed on the finished work piece will have an accuracy determined exactly by that of the teeth of the finishing section of the broach.

Referring now to FIGURE 5 there is diagrammatically illustrated the cuts taken by successive teeth of the several broach sections. This showing is the simplest way of disclosing the shape of successive teeth on each broach section. In this figure the successive teeth of the first roughing section 18 are assumed to take successive cuts along the lines 60, 61, 62, etc., terminating with a cut along the line 64 at the top of the tooth space and along the line 65 at the side thereof. The second broach section then takes successive cuts along the lines 66, 67, 68, etc., terminating with a cut along the line 69 at the bottom of the tooth space, and the lines 70 at the sides thereof. It will be observed that the lines 70 lie inwardly from the lines 65 so that the lower portions of the broaching teeth in the intermediate section 20 are in clearance in the partially cut tooth space as cut by the teeth of the first roughing section 18. The final roughing section takes successive cuts along the lines 71, 72, 73, etc., terminating in a final cut at the bottom of the tooth space along the line 74 and at the sides of the tooth space along the line 75. Again, it will be observed that the lines 75 lie inwardly from the lines 70 and accordingly, the lower portions of the teeth in the final roughing section 22 are in clearance in the tooth slot as previously cut by the roughing sections 18 and 20.

It will be observed of course that the side surfaces of the tooth slot as cut by the roughing sections includes steps between the adjacent surfaces 65, 70 and 75. However, these steps are all removed as the teeth of the finishing section pass through the tooth space. The teeth of the finishing section take successive cuts which may be along the lines 76, 77, 78, etc., terminating in a final cut along the line 79 and to a depth as shown by the line 80. It will be observed that the finishing teeth taking the cuts do not cut to the depth of line 74 and accordingly, the finishing teeth operate in side cutting only.

The finishing teeth of the finishing section 23 are side relieved as previously described.

Desirably, the first few teeth of the finishing section of the broach may be forwardly tapered non-cutting teeth to act as pilots in bringing the finishing section into proper alignment with the tooth slots as cut by the roughing sections of the broach.

The spiral broach constructed in accordance with the present invention provides interlocking between adjacent shell sections along the helices, thus producing continuous spiral splines.

Inasmuch as the shells are relatively short it is possible to form them from forgings of better quality than would be obtainable if the broach were formed of unitary one-piece construction.

Inasmuch as each of the broach sections is relatively short, no steady rest problem is presented and the middle sections may thus be accurately ground without errors due to inability to steady rest an extremely long broach body. Each roughing section may be formed independently of the others and accordingly, the use of a rise and fall cam for grinding back taper would be quite proper. It would be unnecessary to provide continuous back taper from the first tooth of the first roughing section to the last tooth of the last roughing section.

The shells or tubular broach sections are all readily removable and may be removed from the pull bar for resharpening and then replaced without any loss of accuracy.

Considerable economies result in practice of the present invention since individual shell sections can be replaced. The pull bars and front and rear pilots and nut can of course be used over and over again.

One of the important advantages which has previously been referred to is the elimination of intermittent thumping action of the rows of teeth coming into contact with gear blanks. This is very detrimental to good tool life and is completely eliminated by the present invention. Moreover, since the teeth are staggered and in fact the cutting surface of each tooth comes into engagement gradually with the work piece, the built up pressure on the broaching machine is substantially constant and therefore the action is smooth and quite uniform and tends to eliminate some of the drift problems previously encountered.

The drawings and the foregoing specification constitute a description of the improved spiral broach in such full, clear, concise and exact terms as to enable any person skilled in the art to practice the invention, the scope of which is indicated by the appended claims.

What I claim as my invention is:

1. A broach assembly comprising an elongated support bar, a plurality of tubular broach sections removably mounted on said bar, said sections having cutting teeth arranged in a plurality of longitudinally extending series, the teeth of each series being stepped to effect progressive cutting of tooth spaces in a work piece, means clamping said sections rigidly in end to end abutment, means fixing said clamped sections on said bar, a separate tubular finishing section on said bar, means supporting said finishing section on said bar for limited circumferential movement during a broaching operation thereon to permit it to align itself with tooth spaces partially cut in a work piece by the preceding broach section.

2. A broach assembly for broaching helical teeth in an internal gear-like member comprising a support bar, a plurality of tubular broach sections removably mounted on said bar, said sections having cutting teeth arranged in a plurality of longitudinally helically extending series, the teeth of each series being stepped to effect progressive cutting of tooth spaces in a work piece, corresponding teeth in said series being in transverse helical alignment, a radially extending flange on said bar, means clamping said sections in end to end abutment against said flange, the ends of said sections having interfitting surfaces effective to maintain the helical series of teeth thereon in true helical alignment, said interfitting surfaces being angularly disposed and extending generally transversely of the sections in parallelism with said transverse helical series of teeth and occupying gullets between successive teeth and generally longitudinally of the sections in parallelism with said longitudinal helical series of teeth and occupying tooth spaces, whereby the line of junction between adjacent sections is positioned to avoid intersecting any broach teeth.

3. A broach assembly for broaching helical teeth in an internal gear-like member comprising a support bar, a plurality of tubular broach sections removably mounted on said bar, said sections having cutting teeth arranged in a plurality of longitudinally helically extending series, the teeth of each series being stepped to effect progressive cutting of tooth spaces in a work piece, corresponding teeth in said series being in transverse helical alignment, means clamping said sections rigidly in end to end abutment, means at the ends of said sections interfitting to maintain the teeth of said series in helical alignment, means fixedly positioning said sections on said bar, the front surfaces of the teeth being generally perpendicular to the path occupied by the helical series of teeth to form right angle cutting edges on said teeth, a separate tubular finishing section on said bar, and means supporting said finising section on said bar for limited circumferential movement thereon during a broaching operation to permit it to align itself with tooth spaces partially cut in a work piece by the preceding broach section.

4. A broach assembly for broaching helical teeth in an internal gear-like member comprising a support bar, a plurality of tubular broach sections removably mounted on said bar, said sections having cutting teeth arranged in a plurality of longitudinally helically extending series, the teeth of each series being stepped to effect progressive cutting of tooth spaces in a work piece, corresponding teeth in said series being in transverse helical alignment, means clamping said sections rigidly in end to end abutment, means at the ends of said sections interfitting to maintain the teeth of said series in helical alignment, means fixedly positioning said sections on said bar, the front surfaces of the teeth being inclined to the broach axis and generally perpendicular to the path occupied by the helical series of teeth to form right angle cutting edges on said teeth, a separate tubular finising section on said bar having helically extending series of finishing teeth, interfitting means between the leading end of said finishing section and the trailing end of the next preceding section, said finishing section having limited circumferential movement relative to the preceding section during a broaching operation to permit it to align itself with tooth spaces as previously cut by the preceding sections.

5. A broach shell for use in end abutment with a second broach shell, said shell having generally longitudinally extending helical series of stepped teeth, the teeth in each series being separated by gullets, the corresponding teeth in adjacent helical series being in transverse alignment to form generally laterally extending helical series of teeth, an end surface of said shell having a plurality of inclined angularly related portions some of which extend between successive teeth of the same longitudinal helical series in parallelism with lateral helical series, the remaining portions occupying spaces between adjacent longitudinal helical series of teeth and extending in parallelism with said longitudinal helical series of teeth.

6. In a broach assembly, a support bar, a plurality of tubular shells having broaching teeth thereon arranged in both longitudinal and transverse helically disposed series, an abutment on said bar, means clamping said shells in endwise engagement against said abutment, the end surfaces of said shells including interfitting inclined portions disposed in accurately spaced relationship to insure alignment of helical series of teeth extending across the line of engagement between said shells, said inclined surfaces being located entirely in the gullets and tooth spaces of said shells to leave all teeth thereon intact, said surfaces being disposed in parallelism respectively with said transverse and longitudinal helically disposed series of teeth, all but a small number of said surfaces being relieved so that accurate alignment of teeth depends upon accurate formation of a small number of surfaces.

References Cited in the file of this patent

UNITED STATES PATENTS

| | | |
|---|---|---|
| 1,525,708 | Wilson | Feb. 10, 1925 |
| 1,618,429 | Head | Feb. 22, 1927 |
| 1,770,728 | Blomstrom | July 15, 1930 |
| 1,935,774 | Halborg | Nov. 21, 1933 |
| 1,969,977 | Halborg | Aug. 14, 1934 |
| 2,011,630 | Halborg | Aug. 20, 1935 |
| 2,060,889 | Nelsson | Nov. 17, 1936 |
| 2,777,191 | Eklund | Jan. 15, 1957 |

FOREIGN PATENTS

| | | |
|---|---|---|
| 21,860 | Great Britain | Oct. 12, 1903 |
| 414,331 | Great Britain | Aug. 2, 1934 |